United States Patent [19]
Seki

[11] Patent Number: 5,469,537
[45] Date of Patent: Nov. 21, 1995

[54] METHOD OF TRACING A DRAWING AND APPARATUS FOR EMBODYING THE METHOD

[75] Inventor: Nobuhiro Seki, Hyogo, Japan

[73] Assignee: International Technical Illustration Co., Ltd., Osaka, Japan

[21] Appl. No.: 141,958

[22] Filed: Oct. 28, 1993

[30] Foreign Application Priority Data

Oct. 28, 1992 [JP] Japan .................. 4-289845

[51] Int. Cl.$^6$ .................................. G06T 11/00
[52] U.S. Cl. .................. 395/133; 395/136; 395/140; 395/141; 395/142
[58] Field of Search .................. 395/133–139, 395/140, 141, 142, 155, 161, 162; 364/474.29; 382/60

[56] References Cited

U.S. PATENT DOCUMENTS

| | | | |
|---|---|---|---|
| 4,388,620 | 6/1983 | Sherman | 395/141 |
| 4,692,887 | 9/1987 | Hashidate | 364/720 |
| 4,835,722 | 5/1989 | Clarke et al. | 395/142 X |
| 4,941,116 | 7/1990 | Hancock et al. | 364/718 |
| 5,003,498 | 3/1991 | Ota et al. | 395/120 |
| 5,115,494 | 5/1992 | Seki | 395/141 |
| 5,146,551 | 9/1992 | Miyazawa | 395/142 |
| 5,212,770 | 5/1993 | Smith et al. | 395/155 |
| 5,235,678 | 8/1993 | Horiguchi | 395/140 |
| 5,338,200 | 8/1994 | Olive | 395/119 X |

*Primary Examiner*—Almis R. Jankus
*Attorney, Agent, or Firm*—Edwin E. Greigg; Ronald E. Greigg

[57] ABSTRACT

A novel method of tracing a drawing and a novel apparatus for implementing this method. The method and the apparatus presented by the invention can correctly and quickly trace an ellipse from a draft plan. Initially, a display unit displays a draft plan which has been read by an image scanner, and then, the apparatus generates vector data corresponding to the draft plan by activating its own drawing function to trace the draft plan shown on the display screen. The apparatus computes length m0 of a long diameter and length m1 of a short diameter of an ellipse E of the draft plan by directly designating a pair of points Pi0 and Pi1 corresponding to both ends of the short diameter of the ellipse E and another pair of points Pj0 and Pj1 corresponding to both ends of the short diameter of the ellipse E. At the same time, the apparatus computes the direction D and the center point P0 of the long diameter corresponding to the center of the ellipse E, and then, based on those data of length m0 and m1 of the long and short diameters, the direction D, and the center point P0 of the long diameter, the apparatus eventually generates vector data of the ellipse E. Known ratios for ellipses in specific projection drawings, e.g., an isometric projection, are stored in memory means and may be utilized in generating the vector data.

20 Claims, 9 Drawing Sheets

METHOD OF TRACING A DRAWING AND APPARATUS FOR EMBODYING THE METHOD

BACKGROUND OF THE INVENTION

1. FIELD OF THE INVENTION

The present invention relates to a method of tracing a drawing and an apparatus for embodying this method, more particularly, the invention relates to a method of tracing a cubic view and an apparatus for implementing this method.

2. DESCRIPTION OF THE PRIOR ART

FIG. 9 schematically illustrates a block diagram of a conventional CAD system which is capable of tracing each cubic view.

In the same way as is normally found in any conventional CAD system, the main unit 1 of this conventional CAD system incorporates a function to draw straight lines, circles, and ellipses.

(A) Straight line:

I. Using a mouse 12 and cursor, this CAD system designates the initiating and terminating points of each straight line to be drawn.

II. This CAD system designates the initiating point of each straight line to be drawn and inputs data of angle and length via an operation keyboard 11.

(B) Circle:

I. Using the mouse 12 and cursor, this CAD system designates the center point and inputs data of radius via the operation keyboard 11.

II. Using the mouse 12 and cursor, this CAD system designates two points corresponding to diameter.

(C) Ellipse:

I. Using the mouse 12 and cursor, this CAD system designates the center point and inputs data of the direction and length of a long diameter and a length of a short diameter.

Using those functions described above, this conventional CAD system can execute a drawing operation. Furthermore, this conventional CAD system can convert a figure drawn on a paper into vector data after tracing it.

More particularly, a memory means accommodated in the main unit 1 stores a figure drawn on the paper by an image scanner 2, and then activates a display unit 13 to display this figure on a display screen as a draft plan. Then, the CAD system traces the draft plan by activating the above function to draw straight lines, circles, and ellipses.

In consequence, the draft plan is converted into vector data, and in addition, the CAD system can output a fair plan via a plotter or a printer 3.

However, it is essential that a tracing operation be executed in perfect accord with those straight lines, circles, and ellipses of the draft plan.

In the event that the draft plan is actually a plane figure like a design plan comprising straight lines and circles, a tracing operation can easily be implemented. Concretely, a straight line can correctly be traced merely by designating the initiating and terminating points. Likewise, in the event that a draft plan solely comprises circles, since the center position and radius are previously identified in many cases, even when the center position is uncertain, a relatively accurate tracing operation can be executed by designating a pair of points corresponding to a diameter as mentioned above.

On the other hand, when tracing a cubic view, it is essential that an ellipse be traced with utmost accuracy. However, as a whole, an ellipse is drawn merely by applying an elliptic rule, and yet, unlike a plane figure, in many cases, the center point is not explicitly identifiable. In consequence, when introducing a method to determine the center point by initially designating the center point of an ellipse, like the conventional method of drawing an ellipse mentioned above, the center point is merely designated by visual estimate. In consequence, it is quite difficult for any conventional method to correctly draw such ellipses each having identical magnitude (in other words, each having lengths of long and short diameters coinciding with each other) at specific positions correctly matching those positions of the draft plan.

SUMMARY OF THE INVENTION

Therefore, the invention has been achieved to fully solve those technical problems existing in any conventional tracing method. The object of the invention is to provide a novel method of correctly and quickly tracing ellipses in the course of tracing a draft plan, in particular, a cubic view.

To achieve the above object, the invention has introduced those novel means described below. More particularly, as the prerequisite, the method proposed by the invention initially displays a draft plan read by a scanner on a display screen, and then causes a drawing tracing apparatus related to the invention to trace the draft plan shown on the display unit by activating a drawing function, and finally causes the apparatus to generate vector data fully compatible with the draft plan.

When executing the above method proposed by the invention, as shown in FIGS. 1 and 2, initially, a mode-setting means 10 (shown in FIG. 8) sets an input mode.

The input mode functionally comprises a "four-point" mode (or a "three-point" mode) which is available for computing specific values needed for tracing an ellipse based on a pair of points Pi0 and Pi1 corresponding to both ends of a long diameter of an ellipse E of a draft plan and another pair of points Pj0 and Pj1 corresponding to both ends of a short diameter of the ellipse E of the draft plan.

When the "four-point" mode is activated by the mode setting means 10, an input means 20 directly designates a pair of points Pi0 and Pi1 corresponding to both ends of a long diameter of the ellipse E of the draft plan and the other pair of points Pj0 and Pj1 corresponding to both ends of a short diameter thereof.

Next, when the "four-point" mode is input, an arithmetic operation means 30 computes a length m0 of a long diameter and the other length m1 of a short diameter of the ellipse E of the draft plan, and in addition, it also computes a direction D and the center point P0 of the long diameter corresponding to the center of the ellipse E. On the other hand, a vector-data generating means 40 generates vector data of the ellipse E based on the length m0 of the long diameter, the length m1 of the short diameter, the direction D and the center point P0 of the long diameter of the ellipse E.

On the other hand, when the above-referred "three-point" mode is activated, the input means 20 designates either the point Pj0 or the point Pj1 of a pair of points Pj0 and Pj1 corresponding to both ends of short diameter of the ellipse E of the draft plan. The arithmetic operation means 30 initially generates a perpendicular line against a long diameter by way of beginning from the point Pj0 or the point Pj1, and then converts the length doubling the perpendicular into the length m1 of the short diameter.

In the course of executing the above method, if a projection drawing and a projection surface were previously known, the ellipse E of the draft plan can be traced by designating a pair of points P10 and Pi1 corresponding to both ends of the long diameter.

Concretely, the mode-setting means 10 initially sets "two-point" mode, and then sets a specific projection surface.

Next, the input means 20 designates a pair of points Pi0 and Pi1 corresponding to both ends of the long diameter of the ellipse E of the draft plan. The arithmetic operation means 30 then computes a length m0 and the center point P0 of the long diameter of the ellipse E. On the other hand, a memory means 31 previously stores a ratio S of the long diameter and the short diameter of the ellipse E of the specific projection surface and direction D of the long diameter of the ellipse E. Length m1 of a short diameter is computed from the ratio S and length m0 of a long diameter. As a result, specific data needed for generating vector data are secured to enable the vector-data generating means 40 to generate vector data.

Instead of using the above-referenced two points Pi0 and Pi1, the ellipse E of the draft plan can also be traced by designating a pair of points Pk0 and Pk1 corresponding to both intersecting points of the ellipse E and a straight line which is a reference direction in the projection drawing and passes through the center of the ellipse E.

Concretely, the mode-setting means 10 initially sets "two-points of a reference direction" mode. Then the input means 20 designates a pair of intersecting points Pk0 and Pk1. The arithmetic operation means 30 then computes a length n between Pk0 and Pk1 and its center point P0. On the other hand, a memory means 31 previously stores ratio U of the length m0 of the long diameter and the distance n between Pk0 and Pk1 and ratio V of the length m1 of the short diameter and the distance n, and the data of the direction D of the long diameter of the ellipse E. Based on these data, the length m0 of the long diameter and m1 of the short diameter of the ellipse E are computed. As a result, specific data needed for generating the vector data are secured to enable the vector data generating means 40 to generate vector data.

If a projection drawings and a projection surface were previously known, then data needed for executing a tracing operation can be generated by referring to the distance between a pair of diagonal points Pq0 and Pq1 of a rectangle R which is circumscribed with the ellipse E of the draft plan. Concretely, a "diagonal-points" mode is set by the mode-setting means 10, and then a specific projection surface is set.

Next, the input means 20 designates a pair of diagonal points Pq0 and Pq1 of rectangle R which circumscribed with the ellipse E of the draft plan. On the other hand, a memory means 32 previously stores a ratio T of length m0 of a long diameter and the distance between those two diagonal points Pq0 and Pq1 of the rectangle R and the direction D of long diameter specified by the ratio S between the long and short diameters of the ellipse on a specific projection surface and projection surface. Based on these data, the arithmetic operation means 30 computes the length m0 and the center point P0 of a long diameter from the distance between those two diagonal points Pq0 and Pq1 of the rectangle R and the ratio T, and in addition, it also computes a length m1 of a short diameter based on the ratio S between the long and short diameters of the ellipse and length m1 of long diameter. Note that, if a cubic view were based on the isometric projection drawing, then, the ratio T is at $\sqrt{3}/2$.

Next, operative features of the method related to the invention are described below.

Once a pair of point Pi0 and Pi1 corresponding to both ends of a long diameter of an ellipse E of a draft plan are secured, the center point P0 (the center point of the long diameter) of a line segment interlinking those points Pi0 and Pi1 makes up the center of the ellipse. Therefore, the center point P0 of the ellipse E can be secured together with length m0 of a long diameter by activating a mouse 12 and cursor to designate those points Pi0 and Pi1 of the ellipse E of the draft plan. As a matter of course, direction D of the long diameter can also be identified by referring to these points Pi0 and Pi1.

It is essential that length m1 of short diameter be secured concurrent with computation of length m0 of a long diameter. The length m1 can also be computed by designating a pair of points Pj0 and Pj1 corresponding to both ends of the short diameter of the ellipse E of the draft plan.

After securing the length m0 of the long diameter, the center point ps of a long diameter (in other words, the center point of the ellipse E), and the length m1 of the short diameter, vector data of the ellipse E of the draft plan can be generated by applying any conventional computing method.

Even when designating either of those two points Pj0 and Pj1 corresponding to both ends of a short diameter of the ellipse E, the length m1 of the short diameter can be computed by drawing a perpendicular against the long diameter by way of beginning from either of these points Pj0 and Pj1.

A specific projection drawing like the isometric projection drawing is used for drawing a cubic view. If the projection drawings were previously known, direction D of a long diameter and ratio S between the long and short diameters at the time of drawing a circle on a plane surface on specific projection surface are respectively of previously known values. Therefore, once those points Pi0 and Pi1 corresponding to both ends of a long diameter of the ellipse E are respectively designated, like the above case, the center point P0 and the length m0 of the long diameter of the ellipse E can respectively be determined, and in addition, length m1 of the short diameter of the ellipse E can be computed based on the length m0 of the long diameter and ratio S between the long and short diameters of the ellipse E.

Instead of using the above referenced two points Pi0 and Pi1, the ellipse E can be traced by designating Pk0 and Pk1 corresponding to both intersecting points of the ellipse E and a straight line L which is a reference direction in the projection drawing and passes through the center of the ellipse E. Concretely, insofar as the projection drawing is known, the ratio U of the distance n between Pk0 and Pk1 and the length m0 of the long diameter, and ratio V of the distance n and the length m1 of the short diameter are respectively of known values, too. Therefore, the specific length m0 of the long diameter and m1 of the short diameter can be computed based on the distance n between Pk0 and Pk1. Note that, if a cubic view was based on the isometric projection drawing, then the ratio U (m0/n) is at 1.22 and the ratio V (m1/n) at 0.70.

When implementing the isometric projection drawing, the length of diagonal points Pq0 and Pq1 of rectangle R circumscribed with an ellipse of projection surface is $\sqrt{2}$ times as long as the diameter of a circle corresponding to the ellipse, whereas length m0 of the long diameter corresponds to $\sqrt{3}\sqrt{2}$ the diameter of the circle. Therefore, the length m0 of the long diameter corresponds to $\sqrt{3}/2$ (ratio T) of the diameter between those diagonal points Pq0 and Pq1 of the rectangle R. Insofar as projection drawing and projection surface are known, direction D of the long diameter of the ellipse E and ratio S of the length of long and short diameters are respectively of known values, too. Therefore, specific values needed for drawings the ellipse E can be determined by securing a pair of diagonal points Pq0 and Pq1 of the rectangle R which is circumscribed with the ellipse E of the draft plan.

DESCRIPTION OF THE PREFERRED EMBODIMENTS

Figure 1:
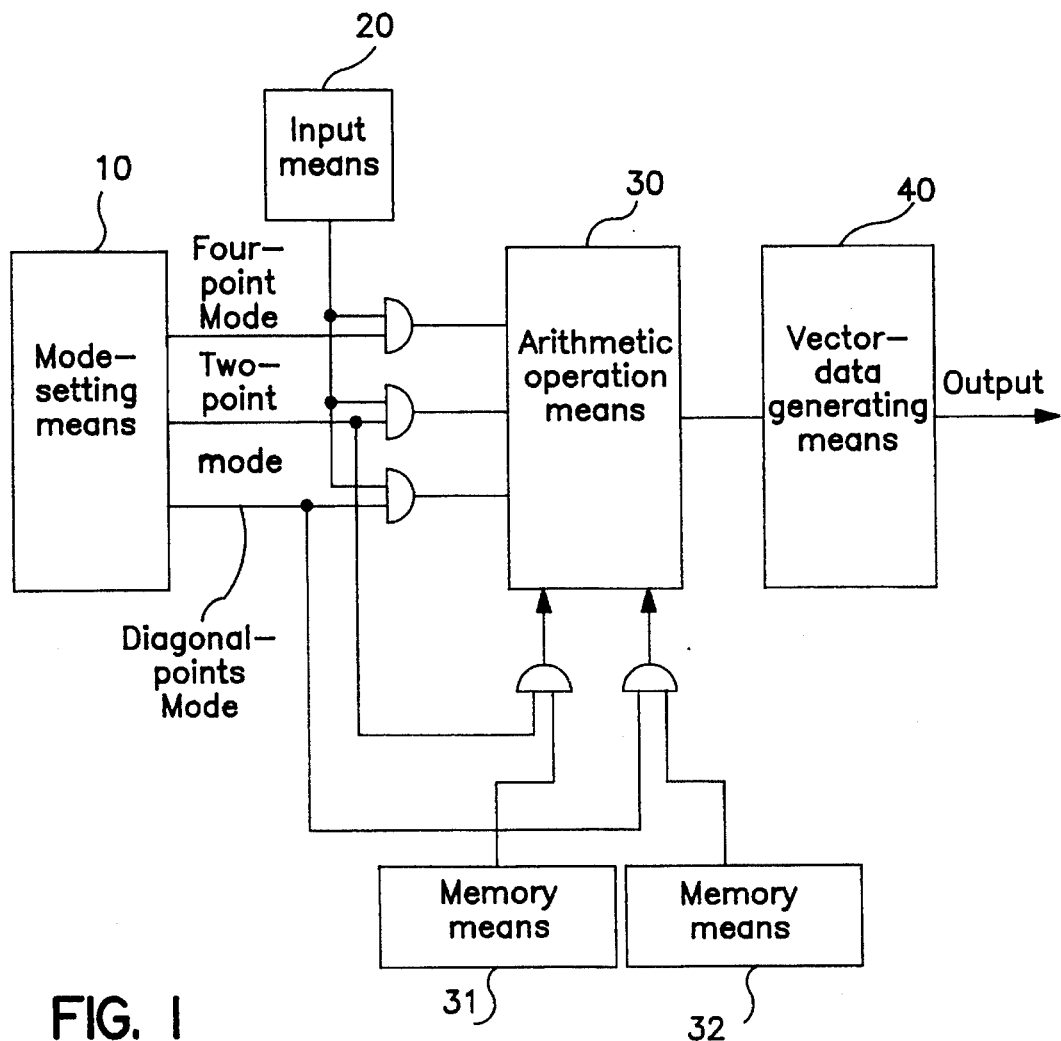
FIG. 1 is a schematic block diagram which is explanatory of the principle of the invention.
Figure 2:
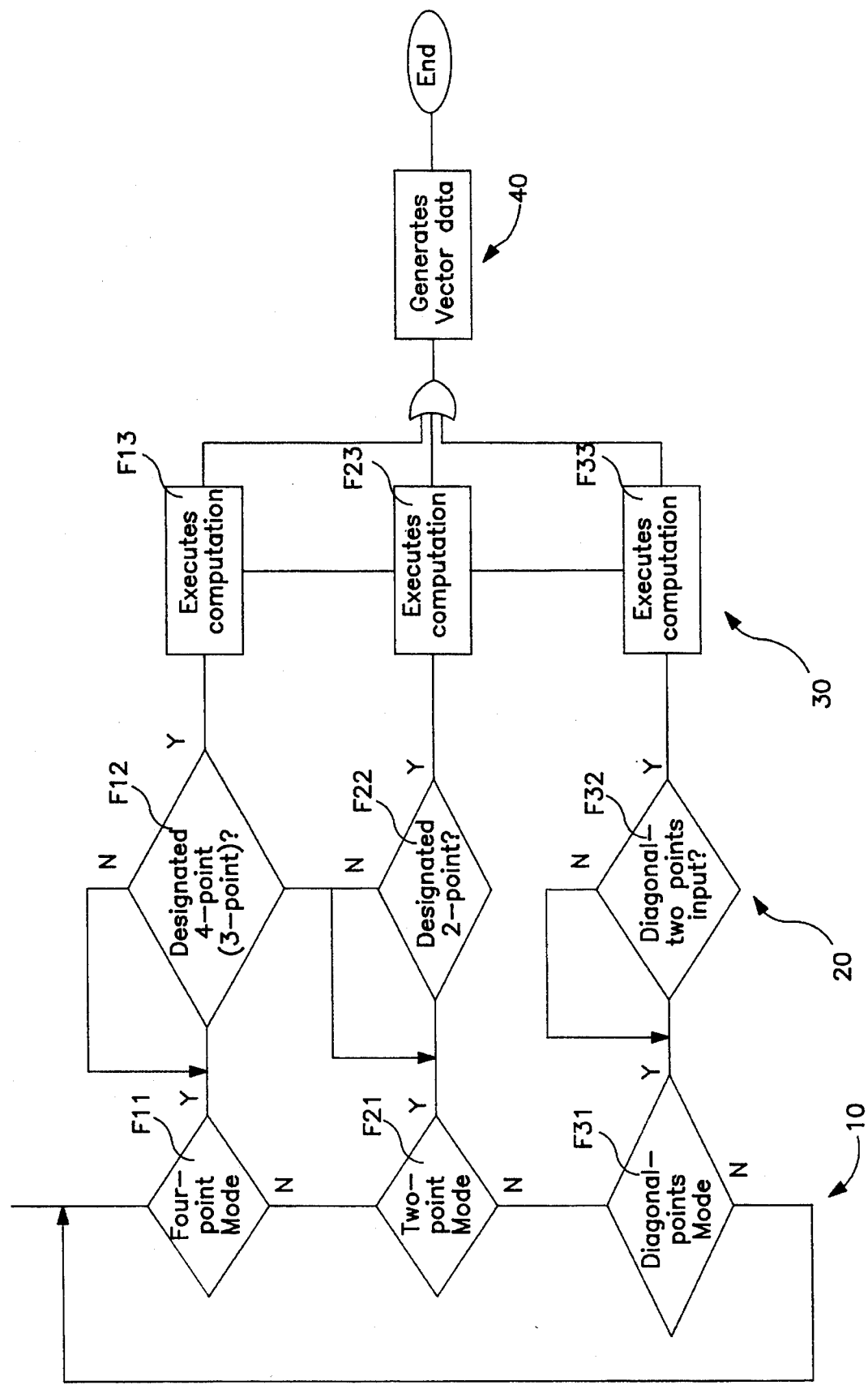
FIG. 2 is a flow chart which is explanatory of the principle of the invention.

FIG. 1 is a schematic block diagram which is explanatory of the principle of the system for tracing a drawing related to the invention. FIG. 2 is a flow chart of the system shown in FIG. 1. When drawing an ellipse, basically, it is essential for the drawing system to predetermine core coordinate, length of a long diameter, direction of the long diameter (or short diameter), and length of the short diameter. This fundamental is consistent even when tracing an ellipse of a draft plan. To correctly determine those essential values specified above, the invention provides specific functional modes including a "four-points" (or "three-points") mode, "two-points" mode, and "diagonal-points" mode. In order to shift an operating program to any of these functional modes, a mode-setting means 10 shown in FIG. 8 selects an appropriate mode from them as per steps F11, F21, and F31 shown in FIG. 2.

When shifting an operating program to any of those functional modes specified above by activating the mode-setting means 10 to select any of them, an input means 20 comprising cursor and a mouse 12 designate specific points corresponding to any of those functional modes as per steps F12, F22, or F32 shown in FIG. 2 based on the designated input points, an arithmetic operation means 30 executes computation in correspondence with the entered mode to determine the length of a long diameter, a center point of the length of the long diameter as the center coordinate of an ellipse, a length of the short diameter, and direction of the long diameter as per steps F13, F23, and F33 shown in FIG. 2. However, when the "two-point" mode and the "diagonal-points" mode are selected, those values needed for executing computation including the direction D of the long diameter being the known value (angle) and ratio S of the length of the long and short diameters for computing the length of short diameter are respectively stored in a pair of memory means 31 and 32.

After securing those fundamental values specified above, based on these essential values, a vector-data generating means 40 generates vector data corresponding to an ellipse E of the draft plan as per steps F14, F24, and F34 as shown in FIG. 2.

Figure 3:
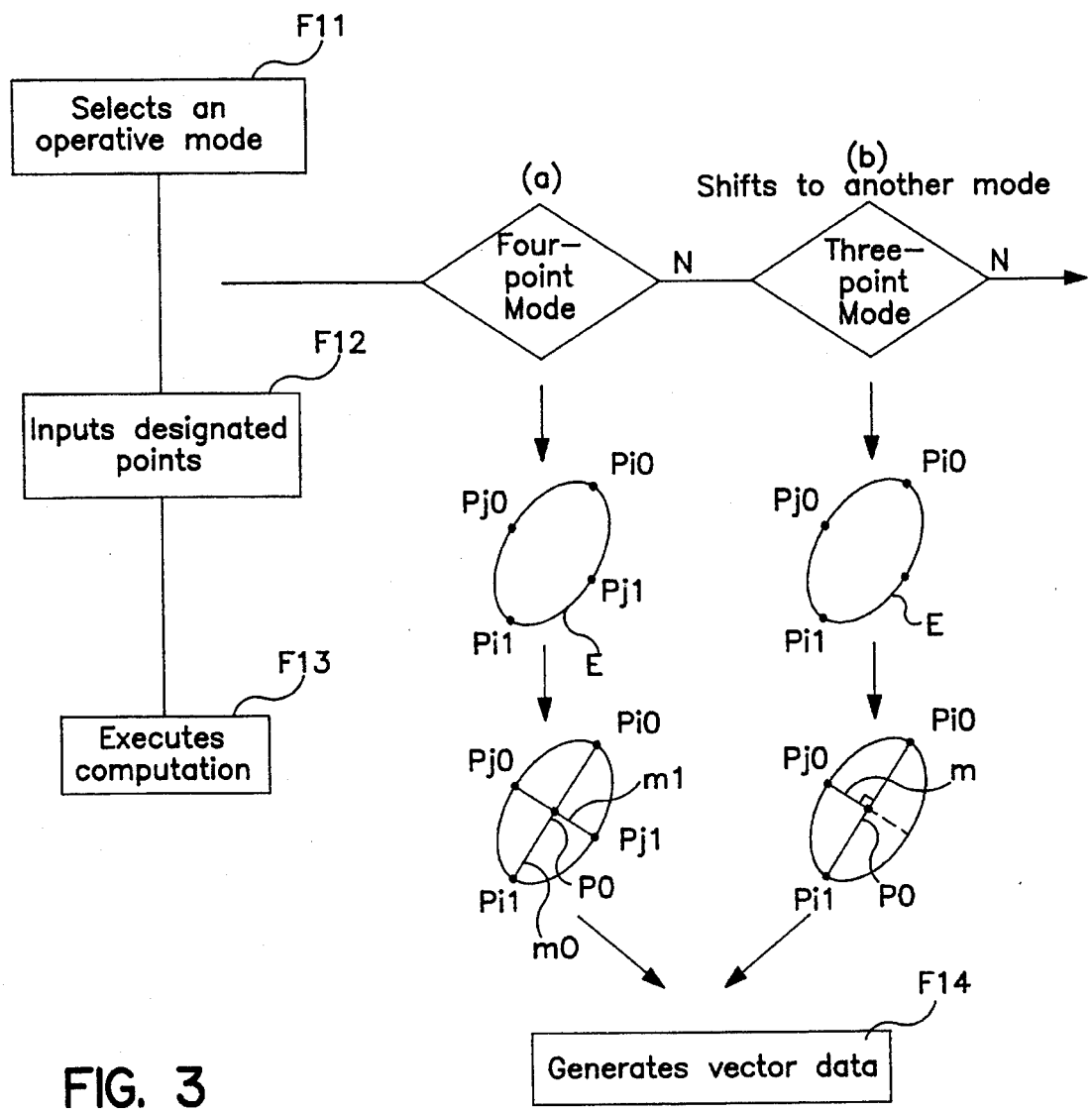
FIG. 3 is a flow chart which is explanatory of another embodiment of the invention.

FIG. 3 is a flow chart used for the execution of the "four-points" mode characterized by the invention. The "four-points" mode is selected by depressing one of three input keys aligned on the bottom rank of the mode-setting means 10 shown in FIG. 8. When the "four-point" mode is entered, initially, the input means 20 inputs four points of an ellipse E of the draft plan in correspondence with the long and short diameters as per steps F11 and F12 shown in FIG. 3.

More particularly, as shown in file (a) of FIG. 3, a pair of points Pi0 and Pi1 corresponding to both ends of the long diameter of the ellipse E of the draft plan shown on a display screen 2 are sequentially designated by operating cursor and a mouse 12. Next, a pair of points Pj0 and Pj1 corresponding to both ends of the short diameter of the ellipse E are sequentially designated. Coordinate data of those long-diameter corresponding points Pi0 and Pi1 are transmitted to the above-identified arithmetic operation means 30, which then computes the length between those long-diameter corresponding points Pi0 and Pi1, in other words, the length m0 of the long diameter of the ellipse E of the draft plan, the center point P0, and direction D of the long diameter corresponding to the center of the ellipse E. As shown in step F13 of FIG. 3, the arithmetic operation means 30 also computes length m1 of short diameter of the ellipse E based on those short diameter corresponding points Pj0 and Pj1.

Figure 8:
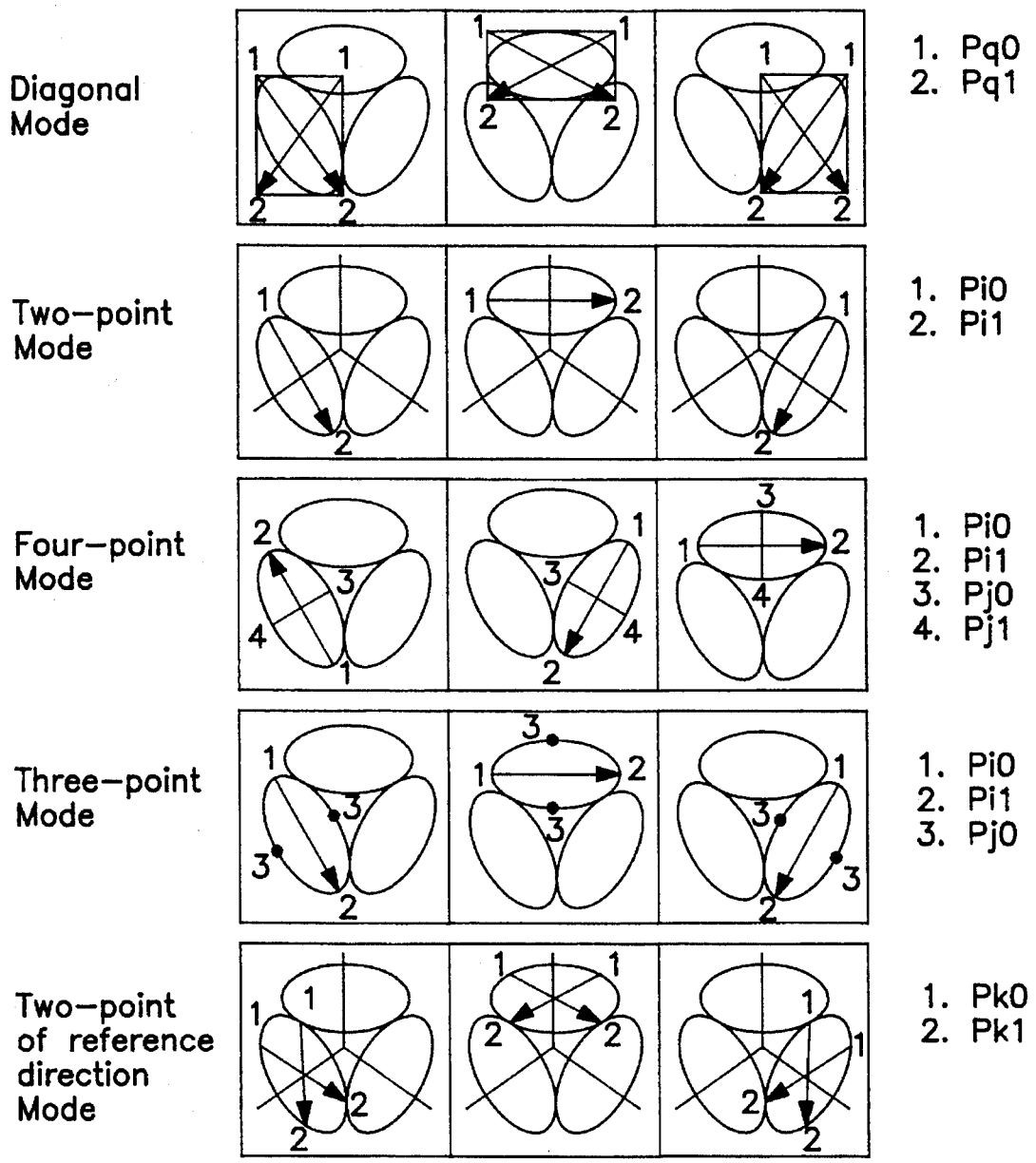
FIG. 8 is a schematic perspective view of a mode-setting means.
Figure 9:
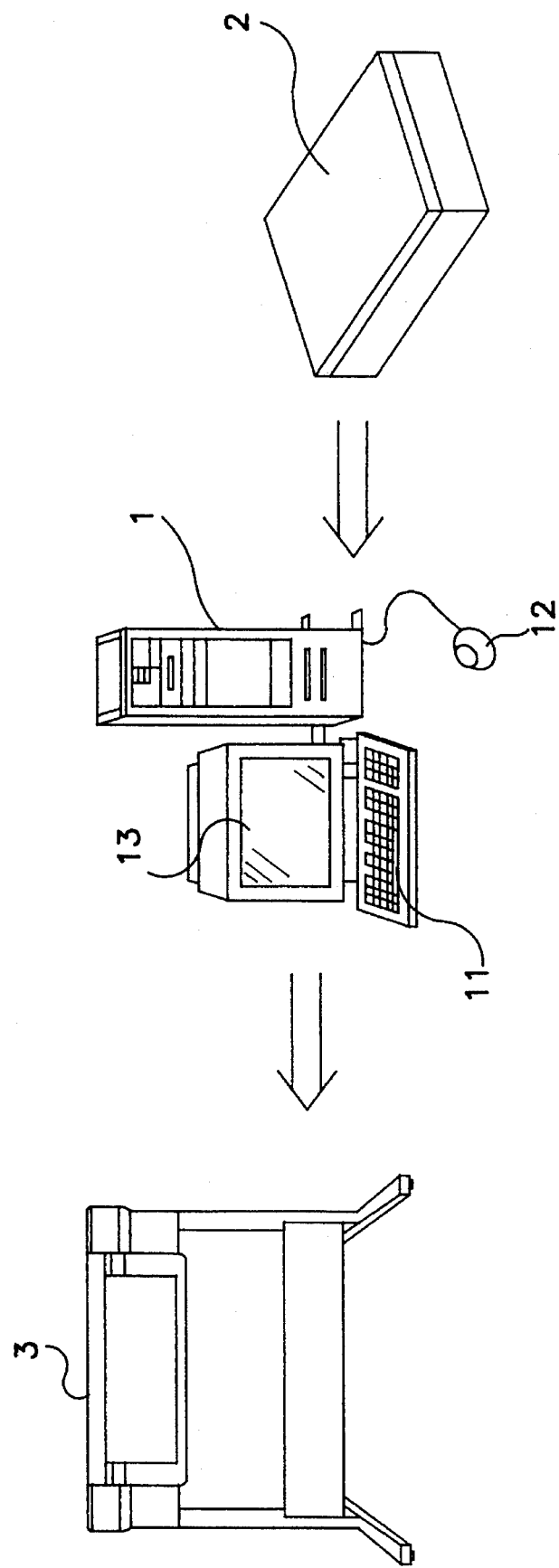
FIG. 9 is a schematic perspective view of a conventional apparatus for tracing drawings.

As shown in step F14 of FIG. 3, the above identified vector-data generating means 40 generates vector data corresponding to the ellipse E of the draft plan based on the computed length m0 of the long diameter, the length m1 of the short diameter, and the center point P0 of the long diameter. FIG. 8 illustrates the state in which the "four-point" mode is further divided into three modes in correspondence with three input keys being provided. This means that, because of functional convenience of the operating program, the input sequence of those two points corresponding to the long diameter and those two points corresponding to the short diameter is subject to change according to the direction of the ellipse E. It should be understood however that the variable input sequence is merely because of convenience for designing the operating program, and therefore, there is no change in the principle of the invention to input a total of four points including those two points corresponding to the long diameter and those two points corresponding to the short diameter.

Availing of the short diameter being perpendicular to the long diameter of the ellipse E, length of the short diameter can be computed by designating either of those short diameter corresponding points Pj0 and Pj1.

Concretely, the "three-points" mode is entered by depressing one of three input keys aligned on the second rank from the bottom shown in FIG. 8. More particularly, as is clear from the "three-point" mode shown in file (b) of FIG. 3, when designating either of those two short diameter corresponding points such as the point Pj0 for example after designating those long diameter corresponding points Pi0 and Pi1, the arithmetic operation means 30 draws a perpendicular from the point Pj0 to the long diameter, and then computes length m1 of the short diameter by doubling the length of the perpendicular. By virtue of the execution of this program, even when activating the "three-point" mode in place of a "four-point" mode, vector data of the ellipse E of the draft plan can be generated.

As shown in FIG. 8, the "three-point" mode is also split into three modes in correspondence with three input keys being provided. Like the above case, this is merely because of convenience for designing the operating program, and therefore, there is no change in the principle of the invention to input a total of three points including those two points corresponding to the long diameter and the other point corresponding to the short diameter.

Figure 4:
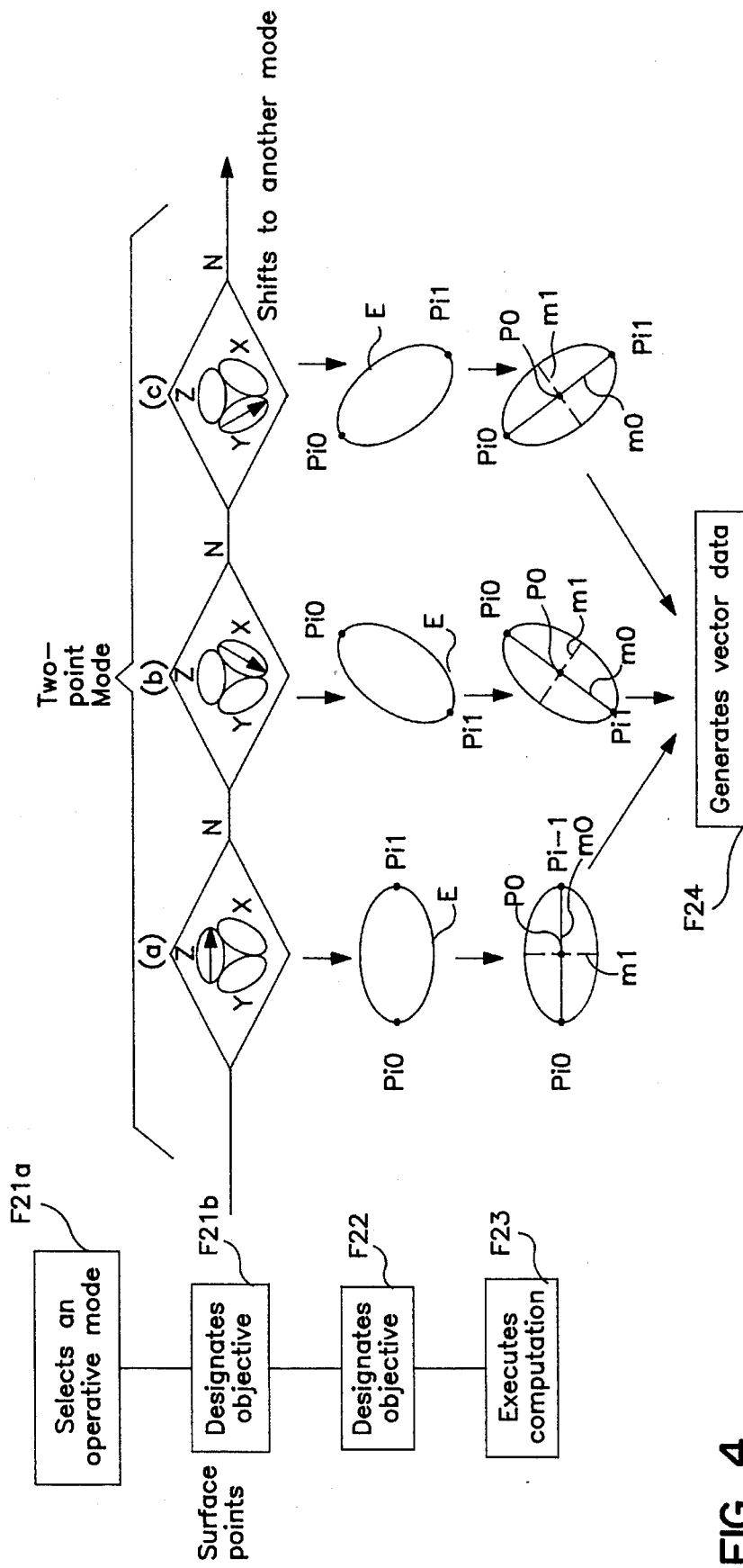
FIG. 4 is a flow chart which is explanatory of another embodiment of the invention.

In many cases, a cubic view is drawn by applying specific projection drawing like the isometric projection drawing for example. When being drawn by specific projection drawing, a circle on a plane surface turns into an ellipse on a projection surface. When a projection surface is specified, direction D of the long diameter of the ellipse and the ratio S between the long and short diameters are automatically determined. Therefore, once the length of the long diameter is determined, all other necessary data can be secured by executing the computation.

concretely, as is clear from files (a), (b) and (c) shown in FIG. 4, when surface Z (or surface X, or surface Y) is designated by the isometric projection drawing, direction of the long diameter of the ellipse is horizontal (or 60° apart from the horizontal, or 120° apart from the horizontal), whereas ratio S of the lengths between the long and short diameters is at 1.22:0.70. Data of these values are previously stored in a memory 31 like a register incidental to the arithmetic operation unit 30.

As is clear from steps F21a and F21b shown in FIG. 4, initially, a "two-points" mode is designated by depressing one of three input keys on the second rank from the top of the mode-setting means 10 shown in FIG. 8, and then a specific surface is designated. Next, the input means 20 designates those long diameter corresponding points Pi0 and Pi1 of the ellipse E of the draft plan. In response, the arithmetic operation means 30 computes length between these points Pi0 and Pi1, in other words, length m0 of the long diameter, and the center point P0 of the ellipse E. At the same time, the arithmetic operation means 30 also computes length m1 of the short diameter after reading ratio S between the long and short diameters from the memory 31 shown in FIG. 1 as per steps F22 and F23 shown in FIG. 4.

After computing length m0 of the long diameter, the center point P0, and length m1 of the short diameter, the vector-data generating means 40 generates vector data of the ellipse E as per step F24 shown in FIG. 4.

Figure 5:
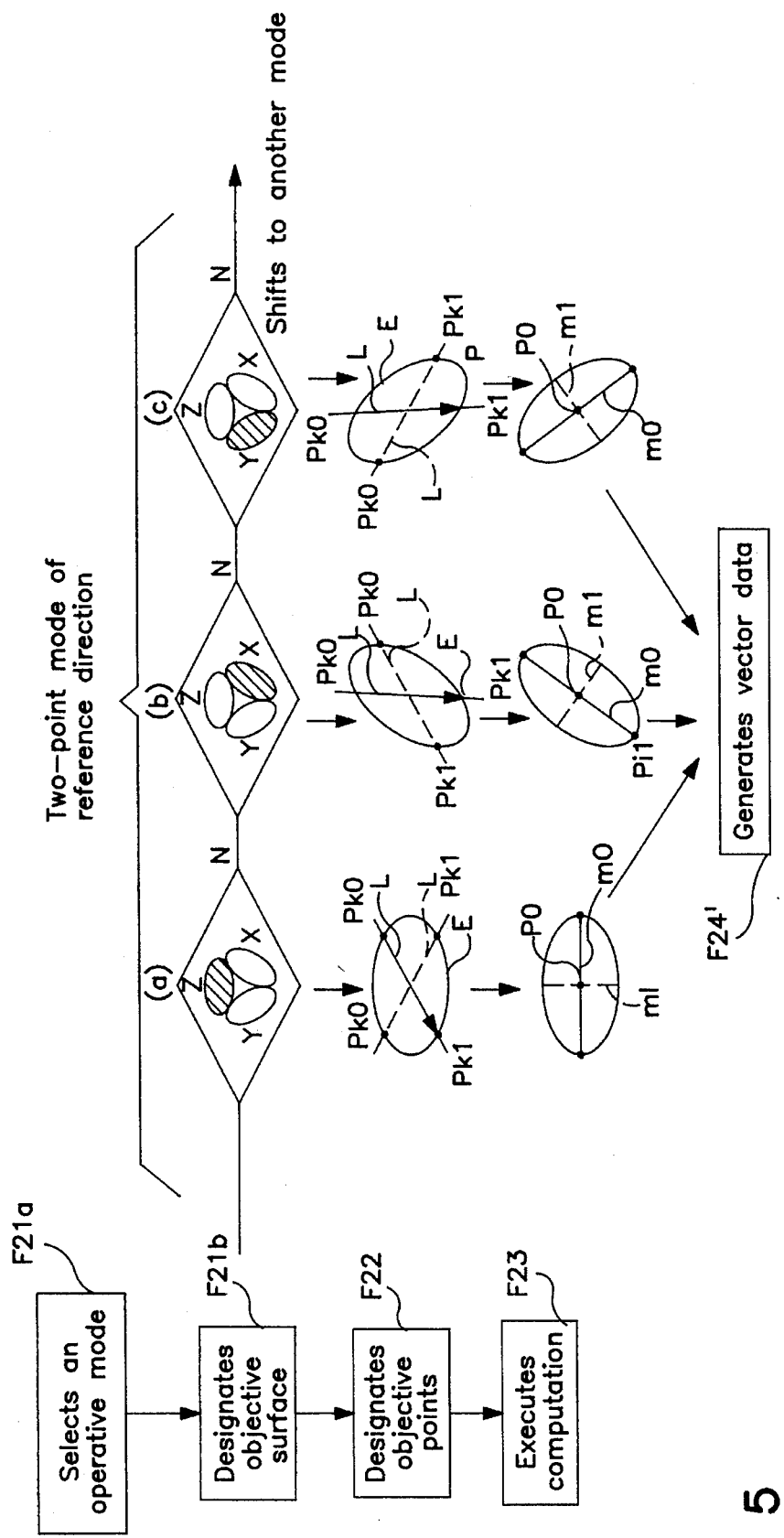
FIG. 5 is a flow chart which is explanatory of another embodiment of the invention.

The ellipse E can also be traced by designating Pk0 and Pk1 corresponding to both intersecting points of the ellipse E and the straight line L which is a reference direction in the projection drawing and passes through the center of the ellipse E as shown in FIG. 5.

When being drawn by a specific projection drawing, the ratio U of the distance n between Pk0 and Pk1 and the length m) of the long diameter, and the ratio V of the distance n and the length m1 of the short diameter are automatically determined. Therefore, when the memory means 31 stores the ratio U and V, the arithmetic operation means 31 also computes the length m0 of the long diameter, m1 of the short diameter and the center point P0 of the distance n between Pk0 and Pk1. Then the memory means 31 stores the data of direction D of the ellipse E to correspond to the projection surface. Therefore, after computing the length m0 of the long diameter, the length of m1 of the short diameter, the center point P0 and direction D of the ellipse E, the vector-data generating means 40 generates vector data of the ellipse E. In the isometric projection drawing, the straight line L is 30 degrees apart from the horizontal line (or 150 degrees apart from the horizontal, −90 degrees apart from the horizontal). While the direction of the long diameter of the ellipse E is horizontal or at an angle of either 60 or 120 degrees to the horizontal line. If a cubic view was based on isometric projection drawing, then the ratio U (m0/n) of the distance n between Pk0 and Pk1 and the length of m0 of long diameter is at 1.22, and ratio V (m1/n) of the distance n and the length of m1 of the short diameter is at 0.70. Note that the operation procedures as shown in FIG. 5 is eliminated to avoid redundancy. For the operation procedure of FIG. 5, refer to that in FIG. 4.

The diagonal length of rectangle R circumscribed with an ellipse on a projection surface of the isometric projection drawings is $\sqrt{2}$ times as long as the diameter of the plane surface corresponding to the ellipse. The length of the long diameter corresponds to $\sqrt{3}/\sqrt{2}$ the diameter of the plane surface, whereas the ratio S of the lengths of the long and short diameters is at 1.22:0.70. Direction D of long diameter can be specified after specifying the projection surface. Therefore, availing of diagonal points of rectangle R circumscribed with an ellipse, operation to trace an ellipse of the draft plan can be implemented in accordance with those functional processes described below.

Figure 6:
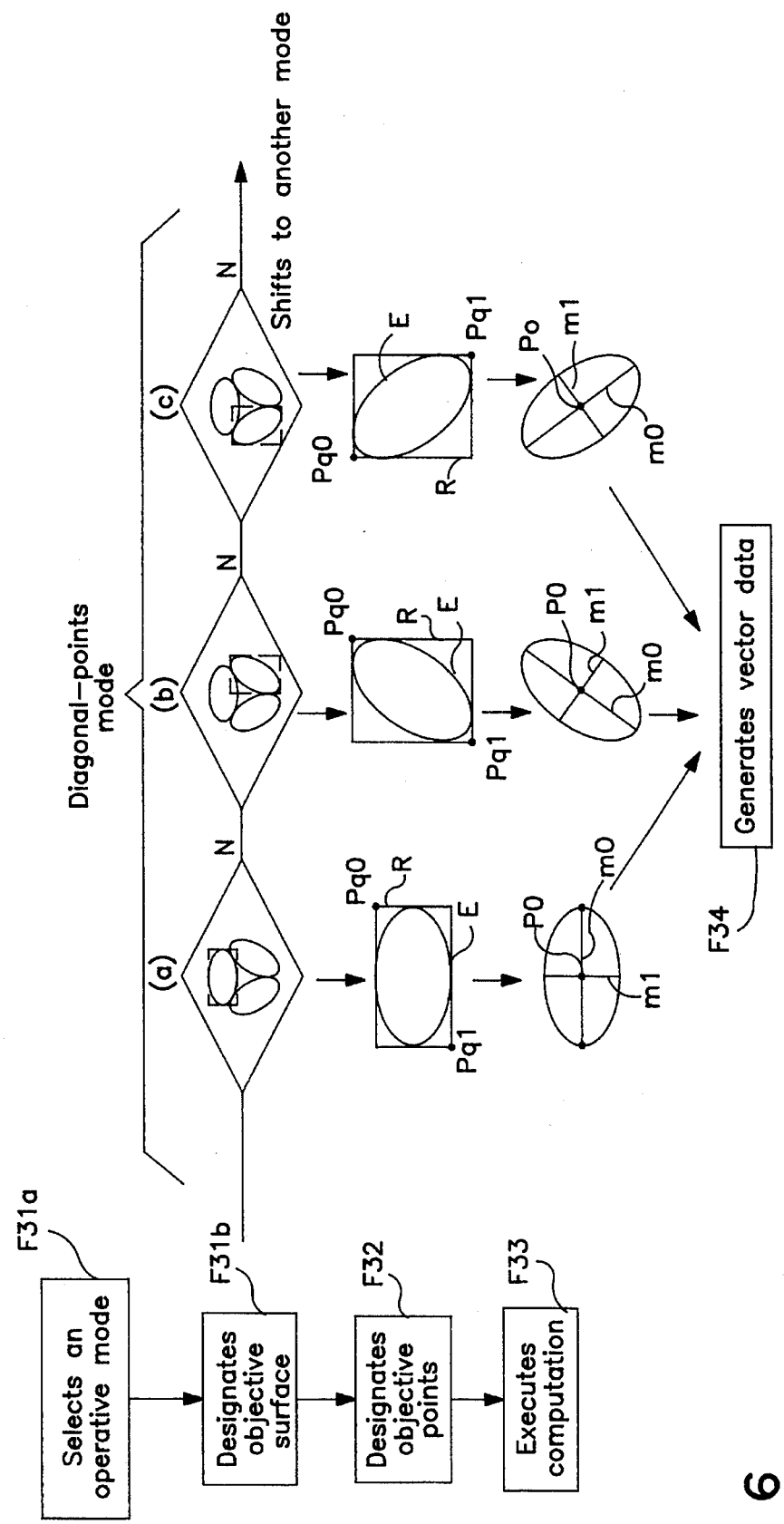
FIG. 6 is a flow chart which is explanatory of a still further embodiment of the invention.

Initially, the "diagonal-points" mode is activated by depressing one of three input keys aligned on the top rank of the mode-setting means 10 shown in FIG. 8, and then a specific projection surface is designated as per steps F31a and F31b shown in FIG. 6.

Figure 7:
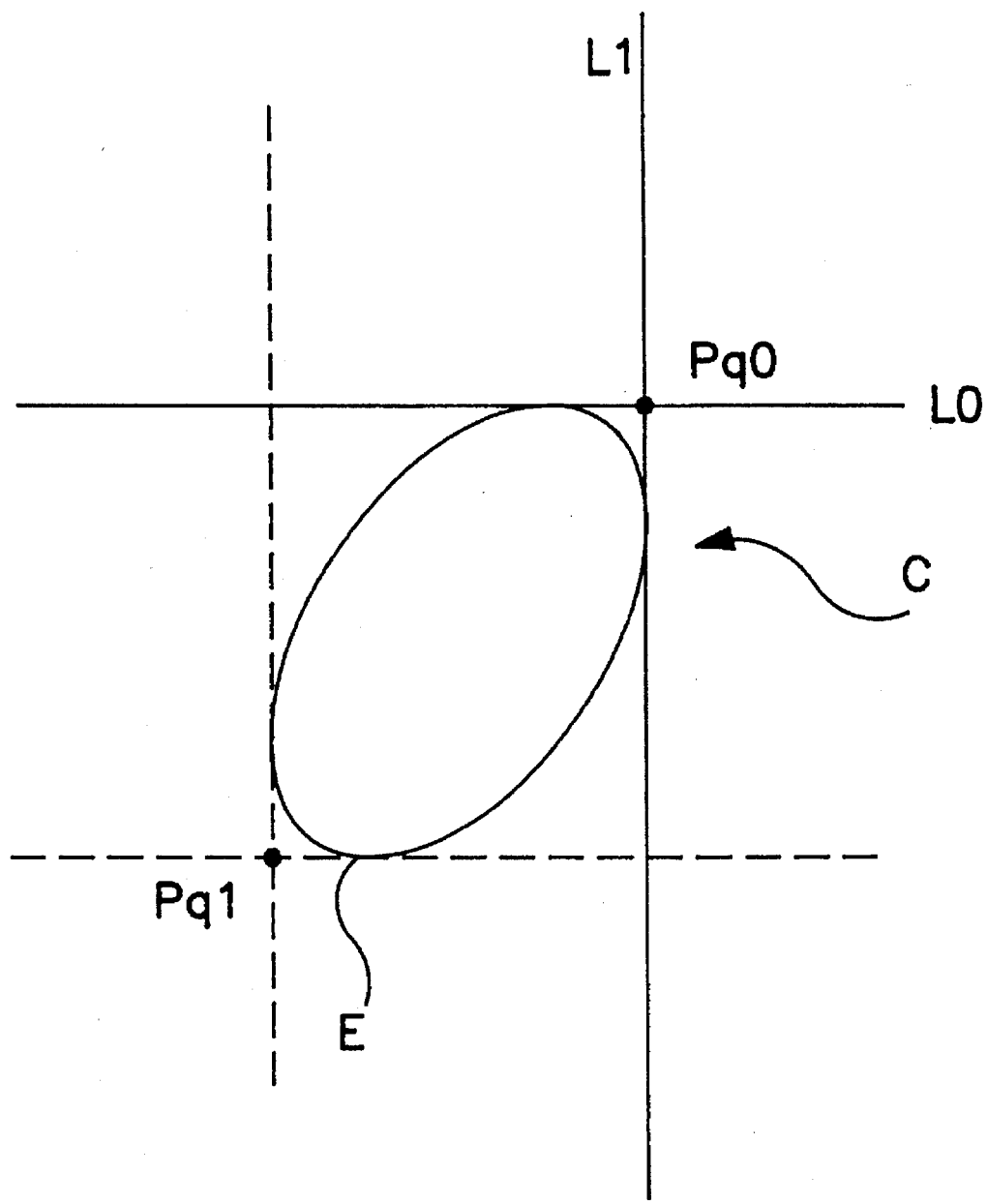
FIG. 7 is a chart explanatory of processes for determining diagonal points of a rectangle circumscribed with an ellipse.

Next, as shown in FIG. 7, position of the crossed cursor C is designated after making an adjustment in order that horizontal line L0 of the cursor C can be brought into contact with the tip of an ellipse E of a draft plan and perpendicular L1 of the cursor C be brought into contact with the right edge of the ellipse E of the draft plan. As a result, a point Pq0 at the upper-left corner of rectangle R circumscribed with the ellipse E of the draft plan can be secured. In the same way, as shown in step F32 of FIG. 6, a point Pq1 at the bottom left of rectangle R circumscribed with the ellipse E of the draft plan can be secured by designating the position of the cursor C in order that the horizontal line L0 of the cursor C can be brought into contact with the bottom edge of the ellipse E of the draft plan and the perpendicular L1 of the cursor C is brought into contact with the left edge of the ellipse E of the draft plan.

After securing those diagonal points Pq0 and Pq1 circumscribed with the ellipse E of the draft plan by executing those sequential processes described above, the arithmetic operation means 30 computes the length of the long diameter by computer $\sqrt{3}/2$ times the length of those diagonal points Pq0 and Pq1. Next, as shown in step F33 of FIG. 5, the arithmetic operation means 30 figures out the center point P0 of the long diameter (in other words, the center of the ellipse E) from the center point between those diagonal points Pq0 and Pq1. The arithmetic operation means 30 also computes the length m1 of the short diameter based on ratio S between the long and short diameters. The memory 32 shown in FIG. 1 previously stores data of the above value $\sqrt{3}/2$ (ratio T), ratio S of the lengths of the long and short diameters, and direction D of the long diameter corresponding to the projection surface. Once the inscribed elliptic mode is set, those data described above can be read out of the memory 32.

In the same way as was done by those functional modes described above, the vector-data generating means 40 generates vector data from those values mentioned above as per step F34 shown in FIG. 6. Two pairs of those diagonal points Pq0 and Pq1 are shown in FIG. 8. Either of these pairs may be used.

According to the novel method of tracing a drawing described above, although designation of those long-diameter corresponding points Pi0 and Pi1 is apt to be executed without sufficient accuracy, the effect of a designation can be corrected by applying bidirectional tangents, and therefore, designation of these points Pi0 and Pi1 can be executed with secured accuracy.

The mode-setting means 10 for activating those input modes described above causes a display screen 12 to previously display figures corresponding to respective modes. There are a variety of practicable methods including a method of designating any of those figures simultaneous with entry of a selected mode or such a method to depress corresponding functional keys by allocating these keys for each mode. Note that, when activating the "four-point" mode, or "three-point" mode, or the "two-point" mode, the arithmetic operation unit 30 computes direction D and center point P0 of the ellipse E of a draft plan based on those long-diameter corresponding points Pi0 and Pi1 of the ellipse E. This is solely because, if the direction D and the center point P0 of the ellipse E were sought from those short-diameter corresponding points Pj0 and Pj1, it will result in the deficient accuracy.

As is clear from the above description, the novel method proposed by the invention enables the related apparatus to correctly trace an ellipse by designating specific points (including the long diameter corresponding points and the short diameter corresponding points) of the ellipse or by effecting input of diagonal points of the rectangle circumscribed with the ellipse of the draft plan. In consequence, the method proposed by the invention precisely draws an ellipse without incurring deviation of center position and magnitude from those of the draft plan at all.

What is claimed is:

1. A method of tracing a drawing, which generates vector data corresponding to a draft plan by activating a drawing function to trace said draft plan displayed on a display unit while displaying said draft plan, read by an image scanner, on said display unit, which method comprises sequential steps including the following:

a step of computing a length m0 of a long diameter and a length m1 of a short diameter of an ellipse E of said draft plan, computing direction D of said long diameter, and center point P0 of said long diameter corresponding to the center of said ellipse E, directly designating a pair of points Pi0 and Pi1 corresponding to both ends of said long diameter and another pair of points Pj0 and Pj1 corresponding to both ends of said short diameter of said ellipse E of said draft plan; and a step of generating vector data of said ellipse E based on said length m0 of said long diameter, said length m1 of said short diameter, said direction D, and said center point P0 of said long diameter of said ellipse E thereof.

2. A method of tracing a drawing, which generates vector data corresponding to a draft plan displayed on a display unit by activating a drawing function to trace said draft plan displayed on a display unit on a specific projection drawing, which method comprises sequential steps including the following:

a step of designating a specific projection surface in said specific projection drawing;

a step of designating a pair of points Pi0 and Pi1 corresponding to a long diameter of an ellipse E of said draft plan;

a step of computing a length m0 of said long diameter and center point P0 of said long diameter corresponding to the center of said ellipse E;

a step of computing a length m1 of a short diameter of said ellipse based on a known ratio S of said long diameter and a short diameter of an ellipse on said specific projection surface corresponding to a circle on a plane surface and said computed length m0 of said long diameter; and a step of generating vector data from a direction D of said long diameter specified by said length m0 of said long diameter, said length m1 of said short diameter, said center point P0 of said long diameter, and the projection surface.

3. A method of tracing a drawing as defined in claim 2, wherein said specific projection drawing is substantially an isometric projection drawing.

4. A method of tracing a drawing, which generates vector data corresponding to a draft plan by activating a drawing function to trace a draft plan displayed on a display unit on a specific projection drawing, said method comprising sequential steps including the following:

a step of designating a specific projection surface in said specific projection drawing;

a step of designating a pair of points Pk0 and Pk1 corresponding to intersecting points of the ellipse E of said draft plan and a straight line L, which is a reference direction in said projection drawing and passes through the center of said ellipse E of said draft plan;

a step of computing a length n between said points Pk0 and Pk1, and the center point P0 of said length n;

a step of computing a length m0 of a long diameter and m1 of a short diameter based on a ratio U of said length n and said length m0 and a ratio V of said length n and said length m1 of the ellipse E of said specific projection surface; and a step of generating vector data from a direction D of said long diameter specified by said length m0 of said long diameter, said length m1 of said short diameter, said center point P0 of length n, and the projection surface.

5. A method of tracing a drawing as defined in claim 4, wherein the specific projection drawing is substantially an isometric projection drawing.

6. A method of tracing a drawing, which generates vector data corresponding to a draft plan by activating a drawing function to trace a draft plan displayed on a display unit while displaying said draft plan said drawing being drawn by a specific projection drawing, said method comprising sequential steps including the following:

a step of designating a specific projection surface in said specific projection drawing;

a step of computing a length m0 of a long diameter of an ellipse E and a center point P0 of said long diameter corresponding to the center of said ellipse E based on a known ratio T between said length m0 of said long diameter and the distance between a pair of diagonal points Pq0 and Pq1 of rectangle R which is circumscribed around said ellipse E of said draft plan;

a step of computing a length m1 of a short diameter based on a known ratio S between the long diameter and the short diameter of an ellipse on said specific projection surface corresponding to a circle on a plane surface and also based on said length m0 of said long diameter; and a step of generating vector data based on a direction D of the long diameter specified by said length m0 of said long diameter, said length m1 of said short diameter, said center point P0 of said long diameter, and said projection surface.

7. A method of tracing a drawing as defined in claim 6, wherein the specific projection drawing is substantially an isometric projection drawing.

8. An apparatus for tracing a drawing, which generates vector data corresponding to a draft plan by activating a drawing function to trace said draft plan shown on a display unit while displaying said draft plan read by an image scanner onto said display unit, comprising the following;

a mode-setting means 10 for setting a "four-point" mode for tracing an ellipse E of said draft plan from a pair of points Pi0 and Pi1 corresponding to both ends of a long diameter of said ellipse E and a pair of points Pj0 and Pj1 corresponding to both ends of a short diameter of said ellipse E of said draft plan;

an input means 20 for directly designating a pair of points Pi0 and Pi1 corresponding to both ends of said long diameter and a pair of points Pj0 and Pj1 corresponding to both ends of said short diameter of said ellipse E of said draft plan;

an arithmetic operation means 30 for computing a center point P0 of the long diameter corresponding to a length m0 of the long diameter, length m1 of the short diameter, a direction D and a center of said ellipse E of said draft plan based on said four points; and a vector-data generating means 40 for generating vector data of said ellipse E base on said length m0 of the long diameter, said length m1 of the short diameter, said direction D, and said center point P0 of said long diameter of said ellipse E.

9. An apparatus for tracing a drawing, which generates vector data corresponding to a draft plan by activating a drawing function to trace said draft plan shown on a display unit by a specific projection drawing comprising the following:

a mode-setting means 10 for setting a two-point mode for tracing an ellipse E of said draft plan based on a specific projection surface in said specific projection drawing and a pair of points Pi0 and Pi1 corresponding to a long diameter of said ellipse E of said draft plan;

an input means 20 which is capable of designating a pair of points Pi0 and Pi1 corresponding to both ends of the long diameter of said ellipse E of said draft plan;

a memory means 31 which stores known data of the ratio s of the long and short diameters of an ellipse on a specific projection surface of said specific projection drawing corresponding to a circle on a plane surface and data of the direction D of said long diameter specified by the projection surface;

an arithmetic operation means 30 for computing length m0 of said long diameter and a center point P0 of said long diameter corresponding to the center of said ellipse E, wherein said arithmetic operation means 30 also computes a length m1 of a short diameter based on said ratio S of the long and short diameters and said length m0 of the long diameter stored in said memory means 31; and a vector-data generating means 40 for generating vector data of said ellipse E based on said length m0 and m1 of said long and short diameters, the direction D, and center point P0 of said long diameter of said ellipse E of said draft plan.

10. An apparatus for tracing a drawing as defined in claim 9, wherein said specific projection drawing is substantially an isometric projection drawing.

11. An apparatus for tracing a drawing, which generates vector data corresponding to a draft plan by activating a drawing function to trace said draft plan shown on a display unit by a specific projection drawing comprising the following:

a mode-setting means 10 for setting "two-points of a reference direction" mode for tracing an ellipse E of said draft plan based on a specific projection surface in said specific projection drawing and a pair of points Pk0 and Pk1 corresponding to intersecting points of said ellipse E and a straight line L which is a reference direction in said projection drawing and passes through the center of said ellipse E of said draft plan;

an input means 20 which is capable of designating said pair of intersecting points Pk0 and Pk1 of said ellipse E of said draft plan;

a memory means 31 which stores data of a ratio of U of said length n between Pk0 and Pk1 and said length m0 of a long diameter and ratio V of said length n and said length m1 of a short diameter, of an ellipse E on a specific projection surface, and a data of a direction D of the long diameter specified by said projection surface;

an arithmetic operation means 30 for computing a center point P0 of the length n corresponding to the center of said ellipse E, wherein said arithmetic operation means also computes the length of m0 of the long diameter and the length of m1 of the short diameter based on the length n and said ratio of U and V stored in said memory means 31; and a vector-data generating means 40 for generating vector data of said ellipse E based on said length m0 of the long diameter, said length m1 of the short diameter, the direction D, and the center point P0 of said length n between Pk0 and Pk1 of ellipse E of said draft plan.

12. An apparatus for tracing a drawing as defined in claim 11, wherein the specific projection drawing is substantially an isometric projection drawing.

13. An apparatus for tracing a drawing, which generates vector data corresponding to a draft plan by activating a drawing function to trace said draft plan shown on a display unit by a specific projection drawing comprising the following:

a mode-setting means 10 for setting "diagonal-points" mode for tracing an ellipse E of said draft plan based on a specific projection surface in said specific projection drawing and a pair of diagonal points Pq0 and Pq1 of a rectangle R which is circumscribed around said ellipse E of said draft plan;

an input means 20 which is capable of designating a pair of diagonal points Pq0 and Pq1 of said rectangle R circumscribed around said ellipse E of said draft plan;

a memory means 32 which stores data of a known ratio S of long and short diameters of an ellipse E on the specific projection surface corresponding to a circle on a plane surface, data of direction D of a long diameter specified by said projection surface and data of a known ratio T between said pair of diagonal points Pq0 and Pq1 of said rectangle R circumscribed around said ellipse E of said draft plan and the long diameter of said ellipse E of said draft plan;

an arithmetic operation means 30 for computing a length m0 of the long diameter of said ellipse E and a center point P0 of the long diameter corresponding to the center of said ellipse E based on the distance between said two diagonal points Pq0 and Pq1 and a ratio T, wherein said arithmetic operation means 30 also computes a length m1 of a short diameter based on a ratio S between the long and short diameters and said length m1 of said long diameter of said ellipse E; and a vector-data generating means 40 for generating vector data of said ellipse E based on said length m0 of the long diameter, said length m1 of the short diameter, the direction D, and the center point P0 of said long diameter of said ellipse E of said draft plan.

14. An apparatus for tracing a drawing as defined in claim 13, wherein the specific projection drawing is substantially an isometric projection drawing.

15. In an apparatus for tracing a cubic view of a draft plan ellipse from a draft plan containing a draft copy of said ellipse, said cubic view being created by forming a specific projection drawing of said cubic view, said apparatus comprising:

storage means for storing a known ratio of a long diameter of an ellipse which would be generated on a specific surface of said specific projection drawing from a circle on a plane surface and the short diameter, of the same ellipse, which would be so generated on the same specific surface;

input means for designating end points of the long diameter of said draft plan ellipse;

arithmetic means for computing the length of said long diameter of said draft plan ellipse from said designated end points and further computing the length of the short diameter of said draft plan ellipse by using said known ratio and said computed length of said long diameter.

16. The apparatus for tracing a cubic view as defined in claim 15, wherein said specific projection drawing is substantially an isometric projection drawings.

17. The apparatus for tracing a cubic view as defined in claim 15, further including means to generate vector data concerning said cubic view of said draft plan ellipse.

18. In an apparatus for tracing a cubic view of a draft plan ellipse from a draft plan containing a draft copy of said ellipse, said cubic view being created by forming a specific projection drawing of said cubic view, said apparatus comprising:

storage means for storing a first known ratio of a diameter of an ellipse which would be generated on a specific surface of said specific projection drawing from a circle on a plane surface and a short diameter of the same ellipse which would be so generated on the same specific surface and for storing a second known ratio of a length of a long diagonal of a rectangle, which circumscribes an ellipse and has its four sides each tangent to the same ellipse on said specific surface, and the length of the long diameter of said circumscribed ellipse;

input means for designating the end points of the long diagonal of a rectangle which circumscribes said draft plan ellipse and has its four sides each tangent to said draft plane ellipse;

arithmetic means for computing the length of said long diagonal of said rectangle circumscribing said draft plan ellipse from said designated end points and further computing the length of the long diameter of said draft plan ellipse by using said known second ratio and said computed length of said long diagonal and finally computing the length of the short diameter of said draft plan ellipse by using said first known ratio and the computed length of the long diameter of the draft plan ellipse.

19. The apparatus for tracing a cubic view as defined in claim 18, wherein said specific projection drawing is substantially an isometric projection drawing.

20. The apparatus for tracing a cubic view as defined in claim 18, further including means to generate vector data concerning said cubic view of said draft plan ellipse.

* * * * *